United States Patent [19]

Morita

[11] Patent Number: 5,472,655
[45] Date of Patent: Dec. 5, 1995

[54] METHOD AND APPARATUS FOR MOLDING MAGNETIC TAPE CASSETTE

[75] Inventor: Kiyoo Morita, Kanagawa, Japan

[73] Assignee: Fuji Photo Film Co., Ltd., Kanagawa, Japan

[21] Appl. No.: 299,338

[22] Filed: Aug. 31, 1994

Related U.S. Application Data

[63] Continuation of Ser. No. 784,129, Oct. 29, 1991, abandoned, which is a continuation of Ser. No. 428,727, Oct. 30, 1989, abandoned.

[30] Foreign Application Priority Data

Nov. 16, 1988 [JP] Japan ................................. 63-287555
Nov. 16, 1988 [JP] Japan ................................. 63-287556

[51] Int. Cl.$^6$ ........................... B29C 45/04; B29C 45/16
[52] U.S. Cl. ................ 264/245; 264/246; 264/247; 264/250; 264/328.7; 264/328.8; 264/310; 425/129.1; 425/576; 425/588
[58] Field of Search ......................... 264/245, 246, 264/278, 250, 255, 247, 297.2, 328.8, 297.3, 328.7, 310; 425/121, 125, 129.1, 130, 575, 576, 577, 588

[56] References Cited

U.S. PATENT DOCUMENTS 3,807,920  4/1974  Aoki ................................ 264/245
4,518,554  5/1985  Hatakeyama et al. ............. 425/129.1
4,726,758  2/1988  Sekihe et al. ..................... 425/575
4,840,760  6/1989  Oishi ................................. 264/245

FOREIGN PATENT DOCUMENTS 62-37118  2/1987  Japan ................................. 425/130
1353603   5/1974  United Kingdom ............... 264/278

*Primary Examiner*—Mathieu D. Vargot
*Attorney, Agent, or Firm*—Sughrue, Mion, Zinn, Macpeak & Seas

[57] ABSTRACT

A method and apparatus for molding casing halves of a magnetic tape cassette in which one or more windows in the casing half are firmly retained by remaining portions thereof regardless of the solubility of the two plastic materials employed or other molding conditions. The window is formed with a projecting edge portion which extends well into the plastic of the remaining portions of the casing half. In one embodiment, the window is molded first and then the remaining portions are molded around the edge portions of the window. In another embodiment, the other portions are molded first using slidable cores to define the window portions, and then the windows are molded.

18 Claims, 4 Drawing Sheets

METHOD AND APPARATUS FOR MOLDING
MAGNETIC TAPE CASSETTE

This is a Continuation of application Ser. No. 07/784,129 filed Oct. 29, 1991. Application Ser. No. 07/784,129 is a Continuation of application Ser. No. 07/428,727 filed Oct. 30, 1989, both now abandoned.

BACKGROUND OF THE INVENTION

The present invention relates to a method and apparatus for molding a magnetic tape cassette, and particularly to a method and apparatus for molding the casing body of a magnetic tape cassette in a plurality of colors.

In a magnetic tape cassette, a pair of hubs on which a magnetic tape is wound are rotatably supported in a casing body composed of upper and lower half portions manufactured by the injection molding of a plastic material. The upper and lower half portions are provided with transparent or semitransparent windows through which the state of winding of the magnetic tape can be observed. If the entire casing body is made of a light-transmissible material, the light transmissibility of the windows is made higher than that of the other parts of the two half portions to make the interior of the casing body more readily visible through the windows. The windows are formed in a desired shape so as to obtain a good overall appearance.

In one type of magnetic tape cassette, the windows are manufactured separately from the casing body of the cassette and are attached to the body by an adhesive, ultrasonic fuse-bonding, or the like. That is, the windows must be manufactured separately from the casing body and then attached thereto. If the casing body is made of a light-transmissible material, the attaching parts of the windows are unavoidably clearly visible, disturbing the appearance of the cassette. For these reasons, a magnetic tape cassette molding method in which the casing body of a magnetic tape cassette is directly molded from plastics in two colors has been frequently employed.

However, since the retention force between the joined surfaces of the two types of plastics constituting the casing body of such a magnetic tape cassette depends on the heat and pressure which are applied to the molten plastic materials when they are subjected to injection molding to form the casing body, the strength of the casing body at the joined surfaces is often insufficient. Particularly, if the thickness of all solid parts of the casing body is small or the plastics are of such kinds as not to be soluble in each other, the problem is very serious with respect to the quality and service life of the cassette.

In order to solve this problem, a construction in which the joined surfaces are stepwise shaped to increase the contact areas thereof has been proposed. However, this approach is not adequate to fully solve the above problem.

In another attempt to solve the problem, a magnetic tape cassette has been proposed in which one of the joined surfaces of the window and the other part of a casing body is provided with a projection at the middle of the thickness of the casing body, and the other of the surfaces is provided with a recess for receiving the projection. Such a cassette is disclosed in Japanese Unexamined Published Utility Model Application No. 60083/85. The projection is molded with the use of a slide core. The slide core, which is slidable in the direction of thickness of the casing body of the cassette, is provided with a recess which extends in the direction of the length or width of the casing body to mold the projection. After molding, the recess of the slide core and the projection made of the injected plastic are separated from each other by sliding the slide core. However, a large amount of strain is created when the slide core is moved. For that reason, the size of the projection and recess of the joined surfaces cannot be made sufficiently large. That is, if the sizes of these members are increased to increase the holding force therebetween, the projection would be overly strained or deformed due to the movement of the slide core.

SUMMARY OF THE INVENTION

The present invention was made in consideration of the above-mentioned problems. Accordingly, it is an object of the present invention to provide a method and apparatus for molding the casing body of a magnetic tape cassette in a plurality of colors in which the retention force between the joined surfaces of plastics injected at different points in time can be made sufficiently high and the surfaces are not strained or deformed.

In accordance with this and other objects, the present invention provides a method and apparatus for molding the casing body of a magnetic tape cassette in which a slide core is provided in a movable die which defines a recess, and a first cavity is formed composed of this recess and a recess defined by a fixed die. A first molten plastic for molding a part of the casing body of the magnetic tape cassette is filled into the first cavity. The movable die is thereafter moved while the part molded from the first plastic is held on the movable die in such a manner that a second cavity, which is to surround the part, is defined. The slide core supporting the part is moved in the direction of the thickness of the casing body so that the part is pushed into the second cavity; and the second molten plastic is then injected into the second cavity so that the second plastic surrounds a projection molded on the side surface of the part and made of the first plastic.

In accordance with another embodiment of the present invention, one of the plastics is injected into a first cavity in which at least a slide core has been previously inserted. The slide core has the same form as the window. The slide core is thereafter moved so that a second cavity in the form of the window is defined. The other of the plastics is then injected into the second cavity to form the window. Recess-forming members are provided in the slide core which are movable perpendicularly to the direction of sliding of the slide core. The recess-forming members have tips which protrude from the outside surface of the slide core and which can be retracted into the slide core. A resilient member urges the recess-forming members in such directions as to protrude the tips thereof from the outside surface of the slide core.

DESCRIPTION OF THE PREFERRED EMBODIMENTS

Preferred embodiments of the present invention are hereafter described with reference to the attached drawings.

Figure 1:
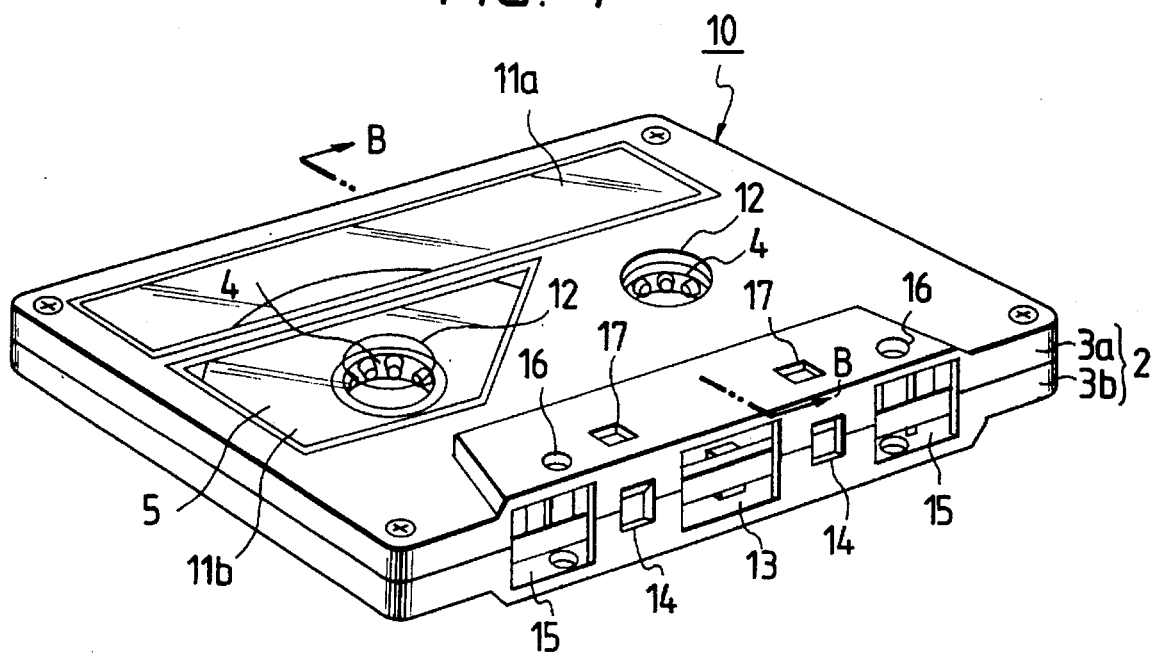
FIG. 1 is a perspective view of a magnetic tape cassette molded in accordance with a method and apparatus of the present invention.

FIG. 1 is a perspective view of a magnetic tape cassette 10 molded through the use of dies and in accordance with a preferred embodiment of the invention.

The upper and lower half portions 3a and 3b of the casing body 2 of the cassette 10, which in this example is an audio tape cassette, have a pair of reel shaft insertion holes 12 in which hubs 4 on which a magnetic tape 5 is wound are loosely fitted so as to be rotatable thereon. The front of the casing body 2 has a central opening 13 into which a recording/playback head is inserted for recording and playback when the cassette is in use. The casing body 2 also has small openings 14 in symmetric positions at the right and left of the central opening 13, openings 15 in symmetric positions at the right and left of the central opening, capstan insertion holes 16, and positioning holes 17. Each of the upper and lower half portions 3a and 3b has two windows 11a and 11b. The casing body 2 is made of an opaque plastic, except for the windows 11a and 11b which are made of a transparent plastic so that the magnetic tape 5 inside the casing body is visible through the windows. Thus, the casing body 2 is molded from opaque and transparent plastics in two colors.

Figure 2:
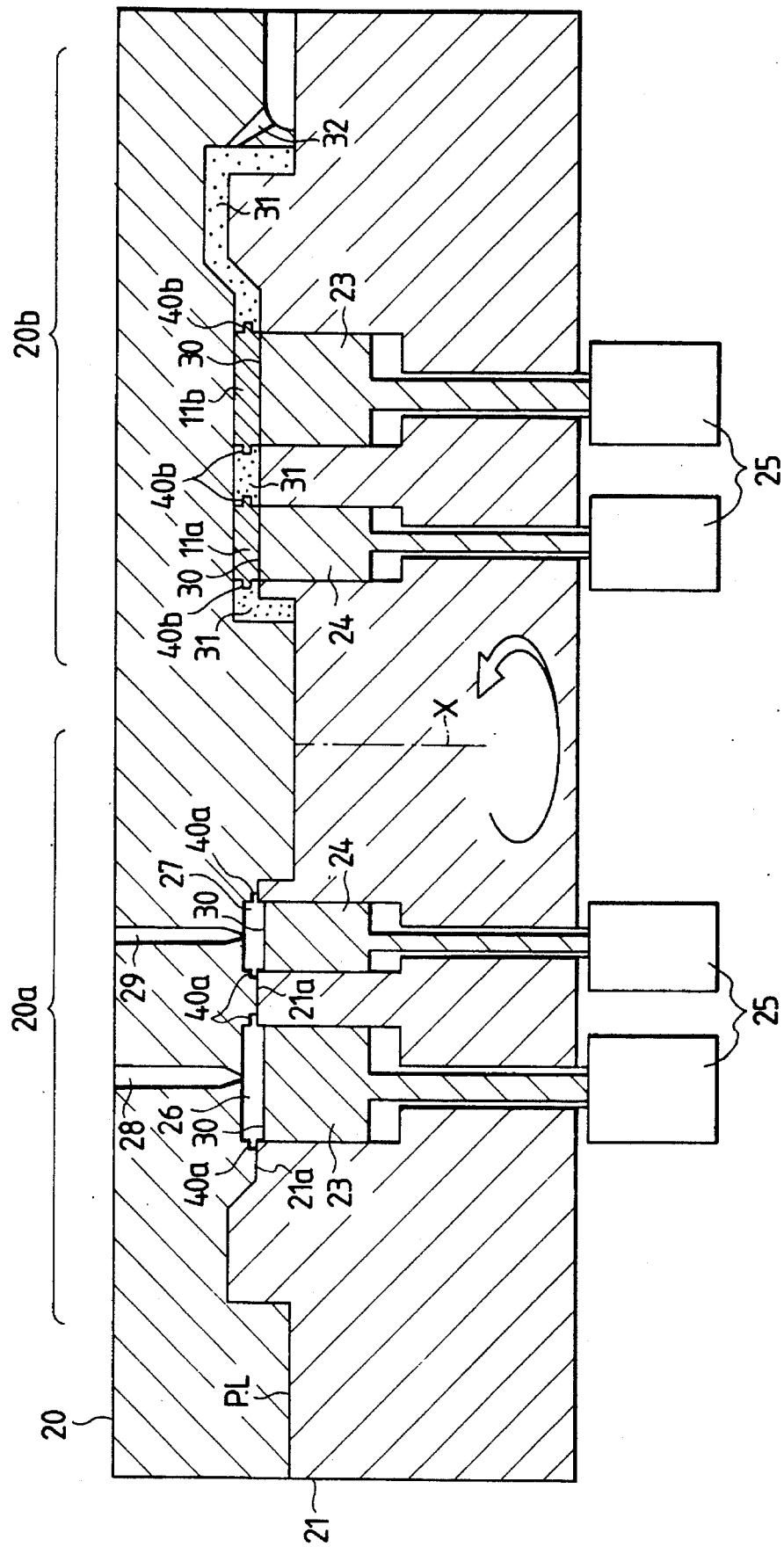
FIG. 2 is a sectional view of major parts of dies constructed in accordance with the present invention and which are used for molding the cassettes of FIG. 1.

The molding of the casing body 2 will now be described with reference to FIG. 2. FIG. 2 is a sectional view of the dies for molding each of the upper and lower half portions 3a and 3b of the casing body 2. The sectional view of FIG. 2 corresponds to a vertical section of the casing body 2 extending along a line B—B shown in FIG. 1.

One of the dies is a fixed die 20 having first and second molding portions 20a and 20b for defining respective cavities of different shapes, and the other of the dies is a movable die 21 corresponding to the fixed die. The fixed die 20 is a monolithic die, on one side of which cavities different from each other in shape are defined. The movable die 21 is provided with a rotation mechanism so that the molding portions of the die 21 can be moved between the first and second molding portions 20a and 20b of the fixed die 20. The molding portions of the movable die 21 are located in positions symmetric to each other about the axis X of rotation of the movable die and corresponding to those of the first and second molding portions 20a and 20b of the fixed die 20. Suitable examples of a rotation mechanism for the movable die 21 are well known from conventional two-color molding processes, and hence will not be described in detail herein.

The movable die 21 is provided with slide cores 23 and 24 corresponding to the first and second molding portions 20a and 20b of the fixed die 20. The slide cores 23 and 24 can be moved in the direction of thickness of the casing body 2, namely, up and down in FIG. 2, by air cylinders 25 provided under the movable die 21.

As for the casing body 2, the windows 11a and 11b are first manufactured by a first injection molding step. That is, the transparent plastic is injected through direct gates 28 and 29 into cavities 26 and 27 defined by the movable die 21 and the slide cores 23 and 24 and the first molding portion 20a of the fixed die 20 (shown at the left in FIG. 2). The cavities 26 and 27 have recesses 40a for molding the projections 40b of the windows 11a and 11b. The recesses 40a, which are located at the middle in the height direction of the windows, extend horizontally in a cavity 31 formed between the fixed and the movable dies 20 and 21 in the second molding step. The cavity recesses 40a are defined between the bottom of the fixed die 20 and the top 21a of the movable die 21, which coincides with the meeting surfaces P.L of the two dies. The tops 30 of the slide cores 23 and 24, which correspond to the bottoms of the windows 11a and 11b, are located below the top 21a of the movable die 21 so that the bottoms of the cavities 26 and 27 for molding the windows are thereby defined. Since the tops 30 of the slide cores 23 and 24 are flat, the entire inner surface of the windows 11a and 11b are completely flat as shown in the right hand portion of FIG. 2.

After the windows 11a and 11b are manufactured by injection molding in the first molding step, the other part of the upper or lower half portions 3a or 3b is manufactured by injection molding in the second molding step. For that purpose, the movable die 21 is lowered away from the fixed die 20 while the windows 11a and 11b molded in the first step are held on the die 21. The movable die 21 is subsequently rotated about the axis X and then raised so that the cavity 31 for molding the other part of the upper or lower half portion 3a or 3b is defined between the second molding portion 20b of the fixed die 20 and the movable die. Then, the air cylinders 25 are activated so that the slide cores 23 and 24 are moved upward. As a result, the tops 30 of the slide cores 23 and 24 are made flush with the top 21a of the movable die 21, and the projections 40b of the windows 11a and 11b extend horizontally in the cavity 31 through a gate 32 so that the other part of the upper or lower half portion 3a or 3b is molded. Because, during the second molding step, the heat and pressure of the injected plastic act upon the windows 11a and 11b and the projections 40b extend for a relatively large distance in the plastic, the retention force between the upper or lower half portion 3a or 3b and the windows thereof is made high enough to prevent the part and the windows from being separated from each other by an external force. Moreover, since no force which could damage the projections 40b of the windows 11a and 11b is applied to the projections when the movable die 21 and the slide cores 23 and 24 are moved, the width of each of the projections can be easily made large. The retention force between the different plastics in two colors is thus increased.

The present invention is not limited to the abovedescribed embodiments in which the projections 40b of the windows 11a and 11b are fitted in recesses of the upper or lower half portion 3a or 3b of the casing body 2 of the cassette, which correspond in form to the projections 40a of the cavities 26 and 27 used to mold the windows. That is, the present invention may be embodied or practiced in various other ways without departing from the spirit or essential character thereof.

Figure 3:
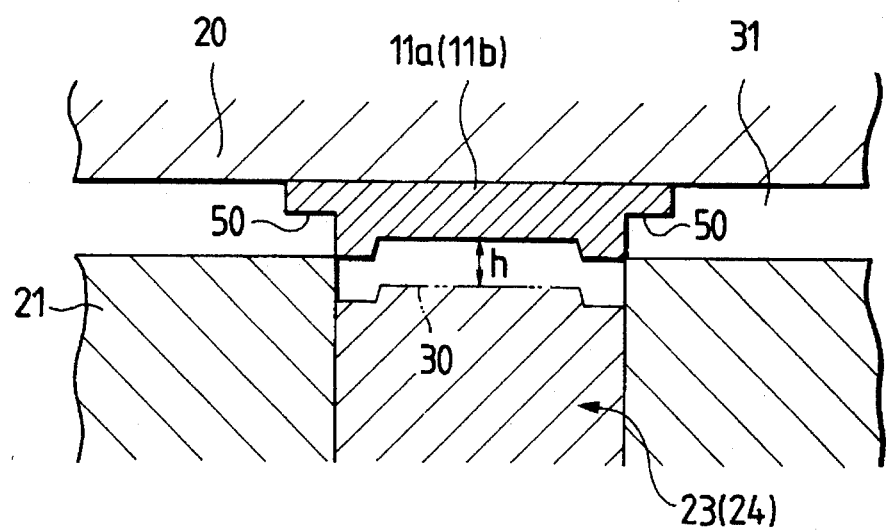
FIG. 3 is a sectional view of major parts of dies which are modifications of the former and are used for molding a modification of the joint of the window and other part of the casing body of the cassette.

For example, the joined surfaces of each window of the upper or lower half portion and the other part thereof may be shaped as steps 50, as shown in FIG. 3. In that case, the slide cores 23 and 24 are moved downward by a distance h in the direction of thickness of the cassette after the molding of the windows so that the steps 50 can be smoothly molded in a size which cannot be obtained using the conventional process. A high retention force, which cannot be obtained using conventional molding techniques, can be easily obtained for the joined surfaces by providing the steps 50. Also, the tops 30 of the slide cores 23 and 24 may be provided with appropriate projections or recesses in order to adequately balance the resistance to the separation of the fixed and the movable dies 20 and 21. Still further, although two-color plastic molding is performed in the above-described embodiment, the present invention may be embodied as a method for molding plastics in more than two colors.

Although the first and the second molding portions 20a and 20b of the fixed die 20 are provided as a single pair of dies, the first and the second molding portions may be provided as two or more die pairs disposed around the axis X of rotation of the movable die 21. Although in the above-described embodiment the fixed and movable dies 20 and 21 are shaped as disks and the movable die is made simultaneously coincident with both the first and the second molding portions 20a and 20b of the fixed die, the movable die may be made coincident with the first molding portion at one point in time and moved to coincide with the second molding portion at another point in time. The movement of the movable die 21 for coincidence with the second molding portion may be performed by any appropriate means.

In a magnetic tape cassette molding method according to the present invention, a slide core is provided in a movable die, a recess is formed between the fixed and movable disk die around the periphery of the slide core, and a first cavity is formed composed of this recess and a recess formed between the slide core and the fixed die. A first molten plastic for molding a window part of the like of the half portion of the casing body of a magnetic tape cassette is filled into the first cavity. The movable die is thereafter moved, while the part molded from the first plastic is held on the die, to a portion of the fixed die where a second cavity surrounding the part is defined between the fixed and movable dies. The slide core supporting the molded part is moved in the direction of thickness of the casing body so that the molded part is pushed into the second cavity. A second molten plastic is then injected into the second cavity so that the plastic surrounds a projection molded on the side surface of the molded part made of the first plastic and which was formed in the recess. The half portion of the casing body of the cassette can thus be molded from the first and the second plastics in different colors.

Since the projection of the molded part extends relatively far into the second cavity at the time of the injection molding of the second plastic, the projection also extends relatively far into the molded second plastic so that the projection is securely fitted into the other molded part of the half portion. For that reason, even if the first and the second plastic materials are not soluble in each other, the retention force between the boundary surfaces of the molded plastics is high enough to prevent the surfaces from separating from each other due to an external force. Also, the width of the projection can be easily set at a relatively large value so as to prevent damage to the projection. Thus, even if the half portion is molded from two or more plastics different from each other in color and not soluble in each other, the strength of the half portion can be made high.

Figure 4:
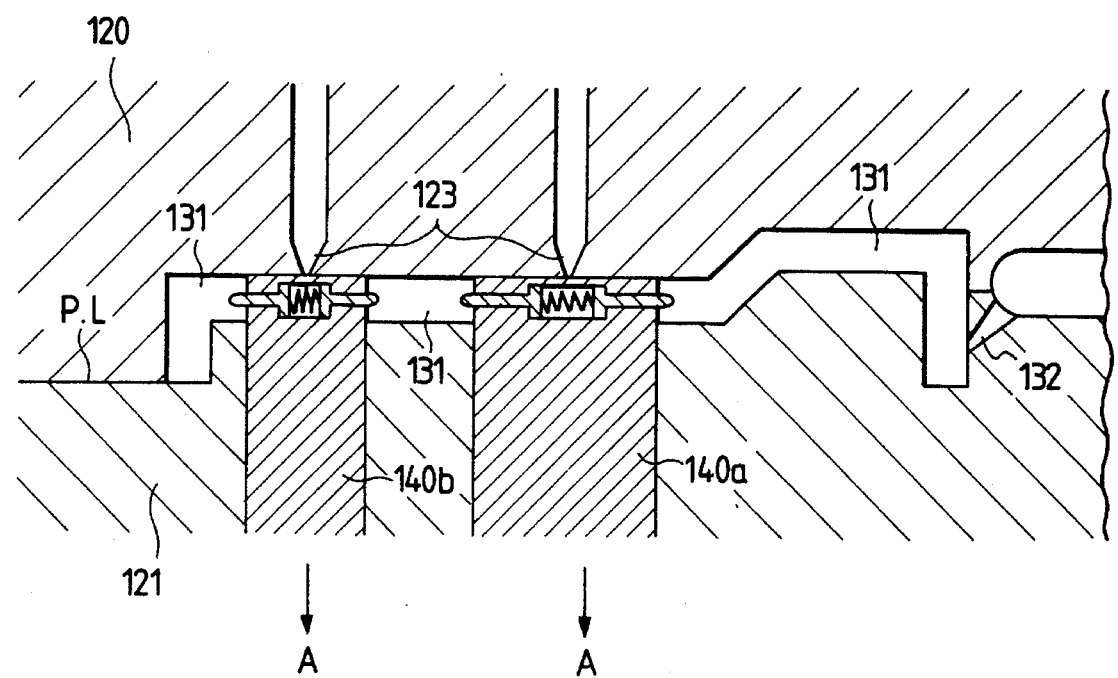
FIGS. 4 and 5 are sectional views of major parts of dies used in the practice of another embodiment of the invention.
Figure 5:
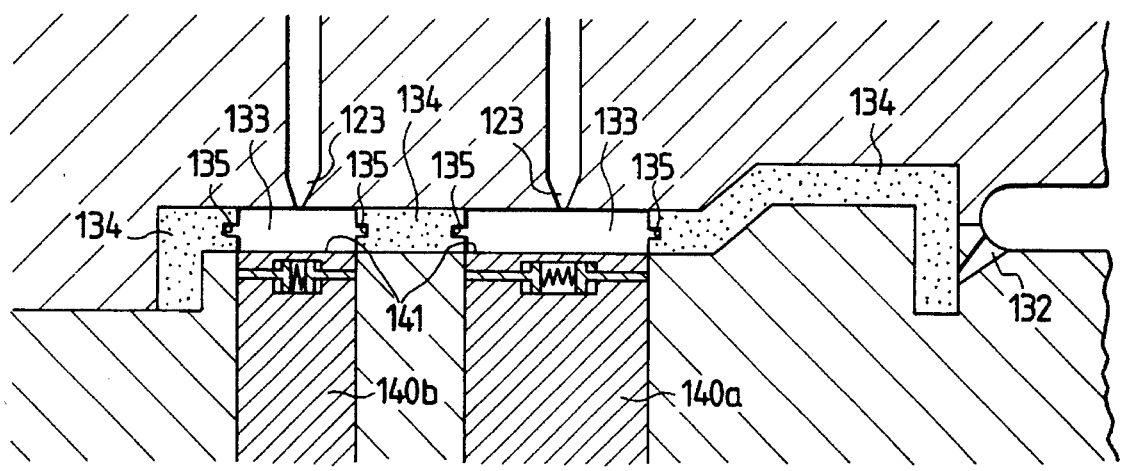

Another embodiment of the present invention will now be described with reference to FIGS. 4–6 of the drawings.

A further method for molding a casing body 2 as shown in FIG. 1 will be described with reference to FIGS. 4–6. FIGS. 4 and 5 are sectional views showing portions of dies used in the second embodiment. FIGS. 4 and 5 correspond to the vertical section of the cassette 10 taken along the line B—B in FIG. 1.

Figure 6:
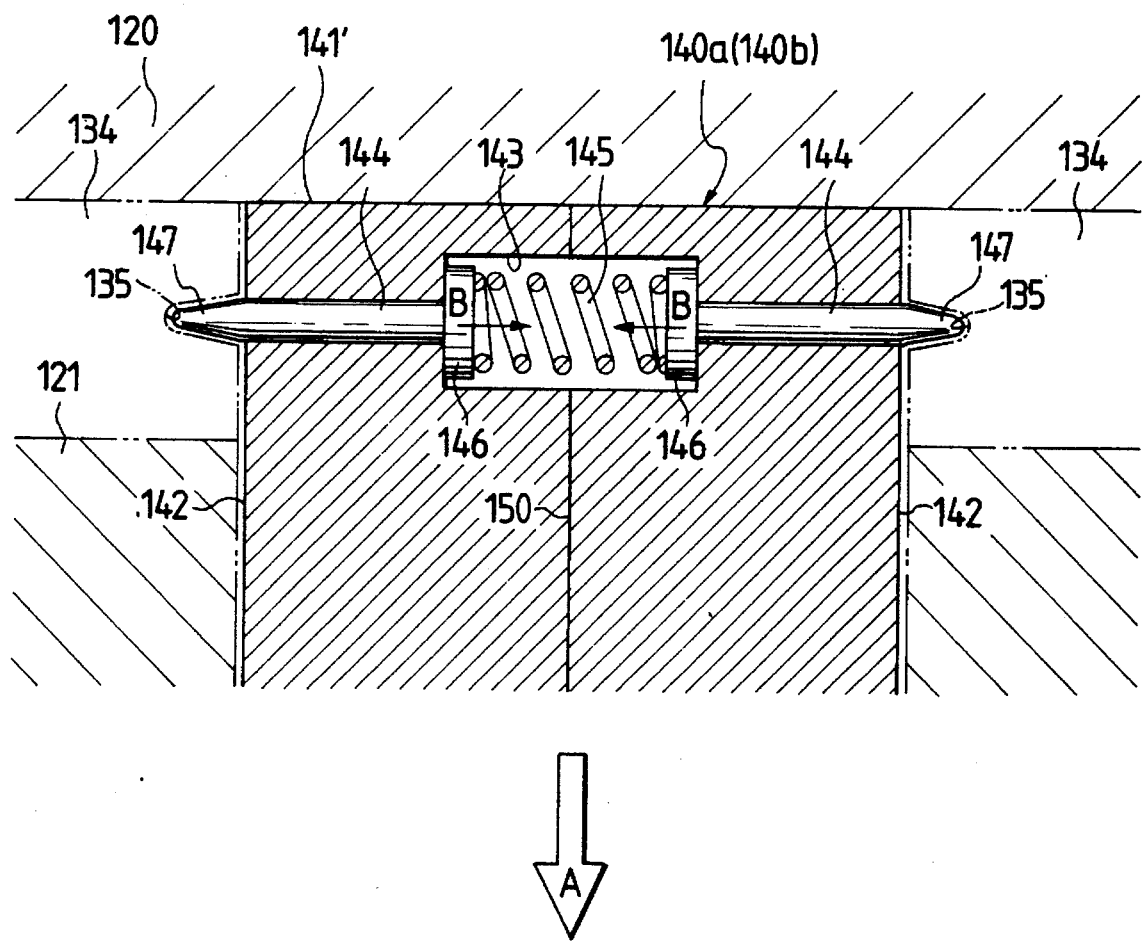
FIG. 6 is an enlarged sectional view of a major part of a slide core shown in FIGS. 4 and 5.

FIG. 6 is a sectional view of a major part of a slide core used in the second embodiment. One of the dies is a fixed die 120, and the other is a movable die 121. Two slide cores 140a and 140b are provided in the movable die 121, which can be moved in the direction of thickness of the casing body 2 by air cylinders provided under the movable die (but not shown in the drawings). The slide cores 140a and 140b have recess-forming members 144 near the tops of the cores, as shown in FIG. 6. Each recess-forming member 144 has a flange 146 in the inner portion of the slide core, and a tapered tip 147 which protrudes from the outside surface 142 of the slide core. A compression spring 145 is interposed between the flanges 146 in an accommodation opening 143 extending in the inner portion of the slide core. The spring 145 pushes the recess-forming members 144 in directions reverse to those of arrows B so as to protrude the tips 147 of the members from the outside surface 142 of the slide core.

The windows 11a and 11b of each of the upper and lower half portions 3a and 3b of the casing body 2 of the cassette 10 are molded from a transparent plastic after the other part of the half portion is molded from opaque plastic. For the molding of the other part, the slide cores 140a and 140b are placed in second molding cavities 133 for the windows 111a and 111b, as shown in FIG. 4, and the molten opaque plastic is thereafter injected into another cavity between the dies 120 and 121 through an internal gate 132 so that the other part is molded as a firstly molded piece 134, as shown in FIG. 5. At that time, the recess-forming members 144 of the slide cores 140a and 140b remain protruded from the outside surfaces 142 of the slide cores so that the tips 147 of the members are located in the firstly molded piece 134. Subsequently, the slide cores 140a and 140b are moved in the direction A of thickness of the casing body 2 so that the tops 141 of the slide cores coincide with the top of the movable die 121. As a result, the second molding cavities 133 are defined.

At the time of the above-mentioned movement of the slide cores 140a and 140b, the tips 147 of the recess-forming members 144 are retracted from the recesses 135 of the firstly molded piece 134 into the slide cores. This may easily be done because the stiffness of the compression springs 145 need not be high and the tips 147 are tapered. Recesses 135 of relatively large size can thus be formed in the surfaces of the firstly molded piece 134. The molten transparent plastic is thereafter injected into the cavities 133 through direct gates 123 so that the windows 111a and 111b are molded. The movable die 121 is then separated from the fixed die 120 to allow removal of the molded half portion 3a or 3b.

The same advantages as in the first-described embodiment are obtained.

Although the recess-forming members 144 protrude a relatively great distance from the outside surfaces of the slide cores 140a and 140b to form the recesses 135 of relatively large size in the firstly molded part 134, the part is not damaged by the movement of the recess-forming members entailed by the downward movement of the slide cores.

Each of the slide cores 140a and 140b can be split along the longitudinal center line 140 thereof to fit the recess-forming members 144 in the slide core.

Although the recess-forming members 144 of each of the slide cores 140a and 140b are oriented oppositely to each other in the above-described embodiment, the present invention is not limited to that arrangement and may be otherwise embodied so that the recess-forming members are provided separately from each other in each slide core. In general, the greater the number of recess-forming members, the higher the retention force between each window of the half portion and the other part thereof. Not only the tip 147 of each recess-forming member 144, but also the entire member may be shaped in various forms. For example, each recess-forming member 144, which is shaped as a pin in the above-described embodiment, may be shaped as a plate to make the width of the recess 135 larger.

Although the above-described embodiment has been described with respect to two-color molding, the present invention may be embodied as dies for molding in more than two colors.

In plural-color molding dies provided according to the present invention, a slide core has recess-forming members which are movable perpendicularly to the direction of sliding of the slide core and which have tips protruding from the outside surface of the slide core and which can be retracted into the core. A resilient member urges the recess-forming members in such directions as to protrude the tips thereof from the outside surface of the slide core.

In molding the upper and lower half portions of the casing body of a magnetic tape cassette using these dies, a plastic for molding the window of the half portion flows into the recesses of the other part of the half portion, which is molded from another plastic before the molding of the window, so that the window has projections corresponding to the recesses and engaged therein. Hence, the retention force between the joined surfaces of the window and other part of the half portion is determined not only by the heat and injection pressure of the later-injected plastic, but also by the physical engagement of the projections and the recesses. As a result, the retention force is made high enough to keep the joined surfaces from being separated from each other when a external force acts upon the half portion in the direction of thickness thereof. The strength of the half portion is thus significantly increased. Thus, even if the plastics which are injected for molding at different points in time are not soluble in each other, the retention force is made sufficiently high.

Although the tips of the recess-forming members protrude a relatively great distance from the outside surface of the slide core to form the recesses of relatively large depth in the earlier-injected plastic, the tips can be retracted into the slide core with only a small amount of force so that there is no damage to the molded part at the recesses. The area of engagement of the projections and the recesses can thus be made large.

What is claimed is:

1. A method for molding a casing half of a magnetic tape cassette having first and second portions and having an inner surface, comprising the steps of:

providing a first mold having a cavity configuration which is the same as that of said first portion, wherein said first mold is formed by a first die and a moveable die positioned in a first position and wherein said first mold has at least one protrusion or recess in an edge region thereof;

filling said first mold with a first plastic to mold said first portion;

moving said moveable die to a second position so that said moveable die and a second die form a second mold having a configuration the same as that of said casing half, wherein moving said moveable die to said second position places said first portion in said second mold;

filling said second mold with a second plastic in regions thereof not occupied by said first portion to mold said second portion; and maintaining the entire inner surface of said first portion completely flat.

2. The method of claim 1, wherein said first portion is a window portion, and said at least one protrusion or recess comprises a recess extending along said edge region.

3. The method of claim 1, wherein said second portion is a window portion, and said at least one protrusion or recess comprises a plurality of protrusions along said edge region.

4. The method of claim 1, wherein said first and second dies are part of a common fixed die and wherein said movable die is rotatably moveable and rotatably moves said first portion from said first mold to said second mold.

5. A method for molding a casing half of a magnetic tape cassette, said casing half having an inner surface, comprising the steps of:

providing a fixed die and a rotatably movable die, wherein said rotatably movable die is rotatably movable between a first position, in which a first cavity is defined between said fixed and rotatably movable dies, and a second position, in which a second cavity is defined between said fixed and rotatably movable dies, wherein said first cavity has a configuration of a window portion of said casing half and said second cavity has a configuration of said casing half, and wherein said first cavity includes a recess along an edge portion thereof;

placing said rotatably movable die in said first position;

filling said first cavity with a first plastic to mold said window portion of said casing half wherein said window portion has a projecting edge portion corresponding to said recess;

rotatably moving said rotatably movable die with said window portion thereon to said second position such that said window portion is placed within said second cavity;

filling said second cavity with a second plastic to mold a remaining portion of said casing half; and maintaining the entire inner surface of said window portion completely flat.

6. The method of claim 5, wherein said rotatably movable die has a movable core therein and said moveable core has a surface corresponding to said inner surface of said window portion and said recess is defined between said fixed and rotatably movable dies around said movable core, and further comprising the steps of withdrawing said movable core into said rotatably movable die for molding said window portion, and extending said movable core when said rotatably movable die is moved to said second position to place said window portion into said second cavity.

7. The method of claim 5, wherein said first plastic is transparent and said second plastic is opaque.

8. The method of claim 5, wherein said projecting edge portion is formed at substantially a middle portion of said window portion in a thickness direction thereof, and said second plastic surrounds said projecting edge portion to firmly retain said window portion in said remaining portion.

9. The method of claim 5, wherein said projecting edge portion is formed along one side of said window portion, said one side being in the thickness direction of said window portion, whereby a stepped edge portion is formed between said window portion and said remaining portion.

10. The method of claim 5, wherein said step of rotatably moving said rotatably movable die to said second position comprises rotating said rotatably movable die around an axis extending between said first and second positions.

11. A method for molding a casing half of a magnetic tape cassette, said casing half having an inner surface, comprising the steps of:

providing a mold having a cavity defined by first and second dies, wherein said first die has a movable core disposed therein and wherein said moveable core has an urging means to urge a plurality of projections to extend beyond edge portions of said moveable core;

positioning said movable core in said cavity so that said moveable core and said plurality of projections substantially form a shape of a window portion of said casing half;

filling said cavity with a first plastic to mold portions of said casing half other than said window portion;

withdrawing said movable core into said first die so that said plurality of projections withdraw into said movable core;

filling portions of said cavity vacated by said movable core and said plurality of projections with a second plastic to mold said window portion; and maintaining the entire inner surface of said window portion completely flat.

12. An apparatus for molding a casing half of a magnetic tape cassette, said casing half having an inner surface, comprising:

a fixed die;

a rotatably movable die, wherein said rotatably movable die is rotatably movable between a first position, in which a first cavity is defined between said fixed and rotatably movable dies, and a second position, in which a second cavity is defined between said fixed and rotatably movable dies, wherein said first cavity has a configuration of a window portion of said casing half and said second cavity has a configuration of said casing half, and wherein said first cavity has a recess along an edge portion thereof;

a moveable core slidably disposed in said rotatably movable die, wherein said movable core has a surface corresponding to an inner surface of said window portion and said recess is defined between said fixed and rotatably movable dies around said movable core; and maintaining means for maintaining the entire inner surface of said window portion completely flat.

13. The apparatus of claim 12, wherein said recess is disposed so as to form a projecting edge portion of said first cavity at substantially a middle portion in a thickness direction of said first cavity.

14. The apparatus of claim 12, wherein said recess is disposed so as to form a projecting edge portion along one side of said window portion in a thickness direction thereof.

15. An apparatus for molding a casing half of a magnetic tape cassette, said casing half having an inner surface, comprising:

a first die and a second die defining a molding cavity therebetween having a configuration of said casing half;

a movable core slidably mounted in said second die and extendable into said cavity, wherein said movable core comprises a plurality of projecting tip portions extending laterally in said cavity perpendicular to a sliding direction of said movable core, wherein said projecting tip portions are slidably mounted in said movable core, and wherein a portion of said moveable core within said molding cavity and said projecting tip portions substantially have a configuration of a window portion of said casing half; and maintaining means for maintaining the entire inner surface of said window portion completely flat.

16. The apparatus of claim 15, further comprising an urging means for urging said projecting tip portions to extend beyond edge portions of said movable core.

17. The apparatus of claim 16, wherein said urging means comprises a spring extending between said projecting tip portions which oppose each other.

18. The apparatus of claim 16, wherein said projecting tip portions have rounded outer ends.

* * * * *